March 10, 1970 H. E. ELLER 3,499,313
METHOD AND MEANS FOR CONTINUOUSLY GAUGING
THE CROSS SECTION OF ELONGATED STOCK
Filed Dec. 11, 1967 2 Sheets-Sheet 1
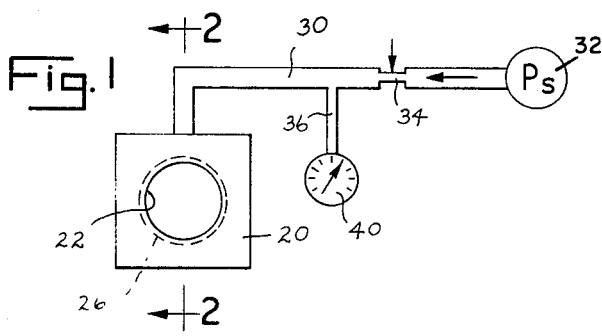
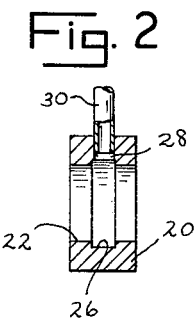
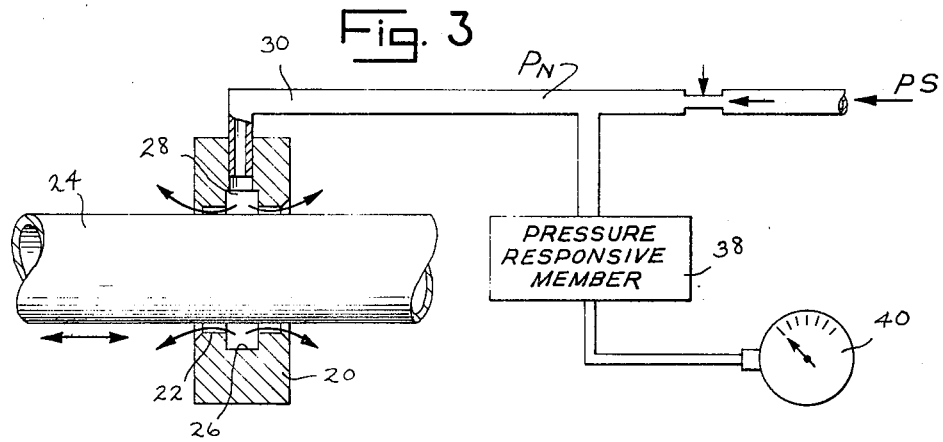
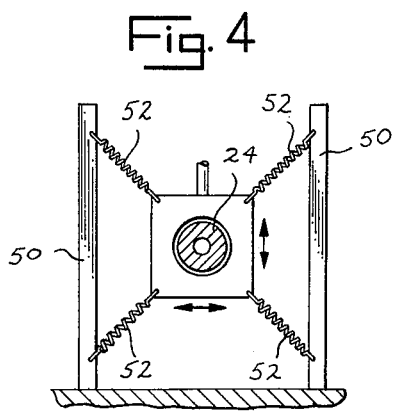
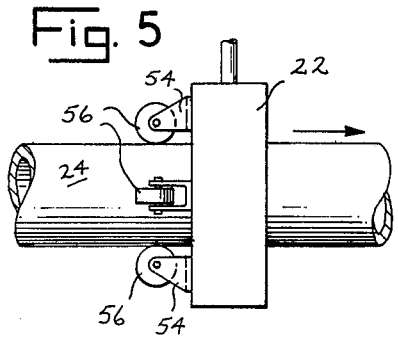
INVENTOR.
HAROLD E. ELLER
BY Eugene C. Knudtsek
ATTORNEY March 10, 1970 H. E. ELLER 3,499,313
METHOD AND MEANS FOR CONTINUOUSLY GAUGING
THE CROSS SECTION OF ELONGATED STOCK
Filed Dec. 11, 1967 2 Sheets-Sheet 2
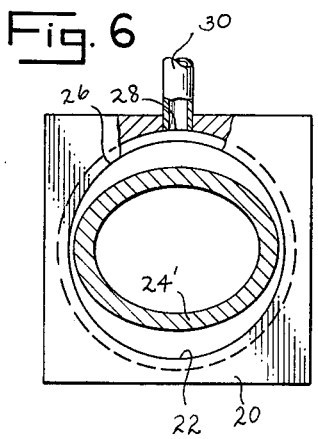
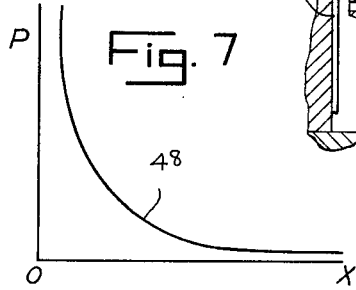
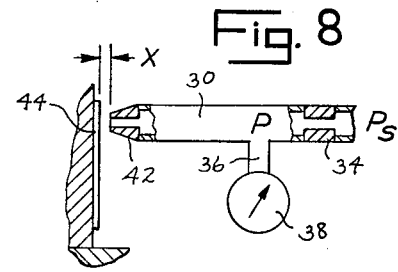
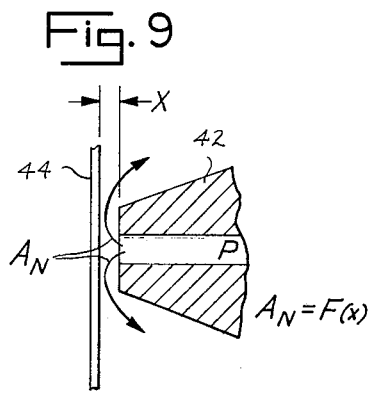
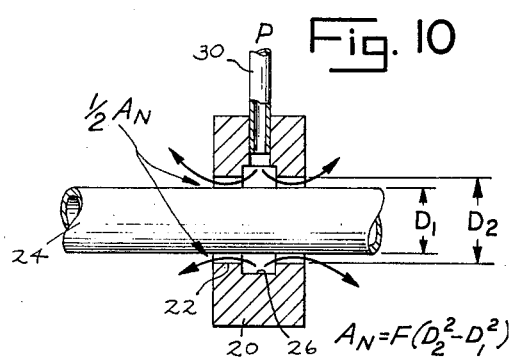
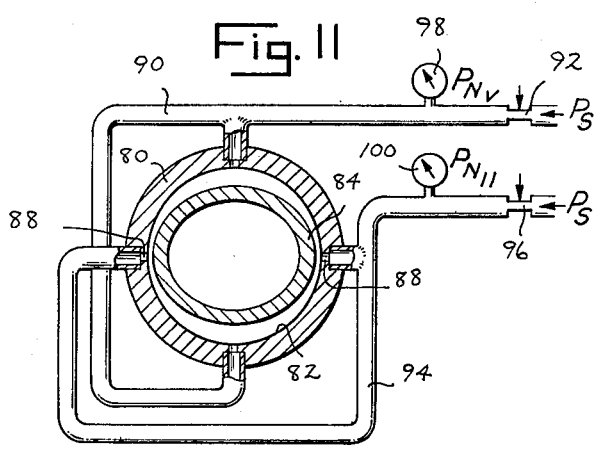
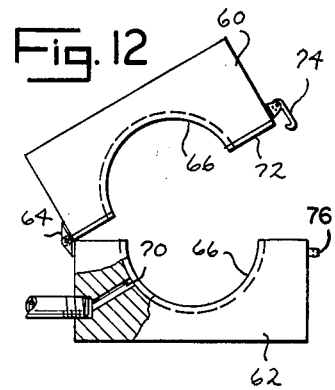
INVENTOR.
HAROLD E. ELLER
BY Eugene C. Kuddock
ATTORNEY United States Patent Office 3,499,313
Patented Mar. 10, 1970

3,499,313
METHOD AND MEANS FOR CONTINUOUSLY GAUGING THE CROSS SECTION OF ELONGATED STOCK
Harold E. Eller, Michigan City, Ind., assignor to The Hays Corporation, Michigan City, Ind.
Filed Dec. 11, 1967, Ser. No. 689,497
Int. Cl. G01b 13/08
U.S. Cl. 73—37.7     6 Claims

ABSTRACT OF THE DISCLOSURE

A method for continuously gauging the cross section of elongated stock by passing the same through a gauging hole of a detector of the same shape and slightly larger cross sectional size to which gas at selected pressure is delivered through a line having a restrictor of greater area than the clearance space between the stock and the hole, and measuring variations in back pressure in the line between the restrictor and the hole. The apparatus for performing the method has either a groove therearound for equalizing pressure around the stock, or has a plurality of lines each of the same gas supply characteristics and connected to a set of opposed gas inlets and having independent back pressure measuring means.

This invention relates to a method and means for continuously gauging the cross section of elongated stock.

In the production of stock of selected cross sectional size and shape as by rolling, continuous casting, extrusion, coating over a base material, painting, or the like, it is desirable to provide a method and means by which the total circumferential or perimetral dimension or the outside area of the product may be measured as it moves. Thus control of production and detection of defective material requires measurement of the total circumferential or perimetral dimension of the stock that may be of a cross sectional shape or size other than desired, such as out of round stock, or that may vary in size or shape along its length in a manner which might not be detected by random measurement or single per piece measurements or simple spot measurements at several points along the length of a product. Prior measuring methods have been subject to delay in detection of improperly processed stock, thus causing substantial waste of material and substantial economic loss and concomitant disadvantages.

It is the primary object of this invention to provide simple, rapid, economical, accurate and efficient means for continuously measuring the total circumferential or perimetral dimension or the outside area of moving stock intended to be of a selected cross sectional size and shape at or closely adjacent to the point of production of the stock.

A further object is to provide a method and means of this character having a detector or gauge block which is associated with an indicator, recorder or controller characterized by a high speed of response and whose signal is usable to indicate the quality of the product being measured and also is usable as a process variable signal for a controller to feed-back and modify the process for producing the product in such a manner as to hold the product quality within specified limits.

Another object of the invention is to provide a device of this character which functions pneumatically and wherein the back pressure of the device is a function of the difference in the cross sectional size of the stock as compared to the area of a gas discharging measuring aperture, and is independent of the actual cross sectional shape of the stock as compared to the shape of the measuring aperture.

A further object is to provide a device of this character wherein air under pressure is discharged circumferentially within a measuring aperture of a gauge block through which stock passes with slight clearance, and in which the variations of air pressure occurring incident to changes in the cross sectional size and shape of the stock are measured accurately regardless of the position of the stock within the measuring aperture.

A further object is to provide a device of this character wherein a detecting member having a measuring aperture through which stock passes with clearance and into which air under pressure is discharged at predetermined pressure is mounted resiliently to accommodate change in position thereof incident to change in the path of travel of the stock being measured which is passed therethrough.

A further object is to provide a device of this character wherein an apertured gauge block having a measuring aperture through which stock is passed continuously with clearance is supplied with air under pressure at spaced substantially coplanar points thereof from different lines whose supplies are similar and whose back pressure drops responsive to variations of clearance of the stock in the measuring aperture can be measured and compared.

A further object is to provide a device of this character utilizing a gauge block having a measuring aperture through which stock passes with clearance and to which air under known constant pressure is supplied, with means for guiding the stock to minimize friction between the stock and the block and to minimize wear of the measuring aperture of the block.

A further object is to provide a device of this character with a gauge block which can be applied to and removed from measuring relation to stock to be measured by rapid and simple manipulation thereof.

Other objects will be apparent from the following specification.

In the drawings:

FIG. 1 is a schematic view of apparatus for performing my new measuring method.

FIG. 2 is a transverse sectional view taken along line 2—2 of FIG. 1.

FIG. 3 is a schematic view of the apparatus with parts shown in section and illustrating the air flow occurring therein.

FIG. 4 is a view illustrating a modified embodiment of the invention.

FIG. 5 is a view illustrating another modified embodiment of the invention.

FIG. 6 is a view illustrating the use of the apparatus to measure stock differing from selected cross sectional shape.

FIG. 7 is a graph illustrating the relation between variations in the diameter or cross sectional dimension of the stock and the back pressure measured in the device.

FIG. 8 is a graph illustrating another form of apparatus for which the graph of FIG. 7 applies.

FIG. 9 is an enlarged schematic view illustrating the flow of air in the device shown in FIG. 8.

FIG. 10 is a schematic view illustrating the flow of air and the measurements made in the instant device.

FIG. 11 is a schematic view illustrating another embodiment of the invention.

FIG. 12 is a view of a gauge block embodying another form of the invention.

This apparatus and method entails the passing of stock intended to have a selected cross sectional size and shape continuously through a gauging hole in a gauging block or detector in which it has slight clearance and into which air from a source of constant pressure passing through a restrictor of selected area larger than the normal clearance area between the stock and the gauging hole is discharged and encounters resistance in predetermined relation to the clearance of the stock in the hole. The back pressure in the supply line between the restrictor and the gauging block is measured and the measurement is calibrated in terms of the circumferential or perimetral dimension of the stock.

One embodiment of the invention is illustrated in FIGS. 1-3, 6 and 10. In this embodiment a detector or gauging block 20 is provided with a gauging hole 22 of accurately predetermined size and shape. As here shown, the hole 22 is circular for gauging round stock, but it will be understood that the gauging hole 22 may be of any shape corresponding to the intended cross sectional shape of the stock such as bar, rod, or tube stock, whose dimension is to be measured. Hole 22 will be of a slightly larger dimension than the cross sectional dimension of the desired stock to be measured thereby providing a predetermined small clearance of stock 24 therein to permit free and unobstructed passage of the stock through the hole. The gauge block will be so mounted or supported in relation to the apparatus forming the stock, such as a rolling mill, an extruder or continuous casting apparatus, as to receive the stock as it is discharged from such apparatus to permit rapid detection of its cross sectional size and shape as discharged from the apparatus.

The hole 22 is interrupted by an enlarged circumferential or inner perpipheral groove 26 which preferably is of substantially uniform depth throughout its extent and is spaced inwardly from the opposite end faces of the block 20. The groove 26 is of such dimensions that air under pressure supplied thereto at inlet port 28 has less resistance to flow therearound than the resistance to flow from the groove through the clearance space between gauging hole 22 and the stock 24. In other words, air under pressure supplied to the groove at the inlet port 28 is substantially uniformly distributed throughout the groove to be of substantially equal pressure at all points in the groove and surrounding the stock, assuming that the stock is of the same shape as the gauging hole and is exactly centered therein so that the celarance thereof in the hole is equal on all radii of the hole.

A supply line 30 is connected to the inlet port 28 and is supplied by a constant pressure supply source 32 of air or other gas which may include a compressor, a supply tank or cylinder and pressure regulating means (not shown). Within the line 30 is positioned an adjustable restrictor 34, such as a valve. The restrictor must have the range of adjustment to insure that its cross sectional flow-accommodating area can be greater than the total clearance area between the gauging hole 22 and the stock 24.

A branch line 36 communicates with supply line 30 between the restrictor 34 and the gauge block 20 and is connected to any suitable pressure responsive member 38. The pressure responsive member 38 may be a device for indicating or recording pressure, or a controller or computer responsive to pressure, or a pressure-to-current transducer, or a pressure-to-pressure pilot. The device may have a suitable pressure indicator 40 separate therefrom as illustrated in FIG. 3 or integral therewith as illustrated in FIG. 1, which indicator can be calibrated in reference to circumferential or perimetral measurements.

In the use of the device, assuming that it is to be used to gauge tubing 24 of circular cross section to have a seletced outer diameter, a gauge block 20 will be connected to the line 30. Gauge block 20 has a gauging hole 22 of a slightly larger diameter than the outer diameter of the tubing 24, and the leading end of a length of tube will be introduced therein, such as the leading end of a tube being discharged from a tube-forming mill or an extruder. The adjustable restrictor 34 will be adjusted to provide a gas flow passage therethrough having a cross sectional area or size greater than the total circumferential clearance area desired between the tubular work or stock 24 and the gauging hole 22. The pressure of the constant pressure gas source 32 will be selected and the pressure responsive member 38 and pressure indicator will be correlated relative thereto.

In the operation of the device, gas under the known pressure from the source 32 flows from the source through the restrictor and the line 30 and enters the gauging block at the inlet 28 and thence flows through the groove 26 so that gas at substantially uniform pressure surrounds the stock within the gauge hole. The gas discharges from the groove 26 through the gauging hole 22 completely around the stock in the direction of the arrows shown in FIG. 3. Inasmuch as the clearance space between the stock 24 and the gauging hole 22 has an area less than that of the restrictor 34, back pressure will occur in line 36 and is operative to actuate the pressure responsive member 38. The pressure responsive member 38 and the pressure indicator 40 can be calibrated in terms of the circumferential or perimetral dimension of the stock 24. Consequently, if variations in the cross sectional size of the stock occur at any point along its length an immediate indication of such variation is given at the pressure responsive member 38 and the indicator 40 by reason of the variation in the back pressure in the branch line 36. Thus, if the cross sectional size of the stock should reduce, the clearance space between the stock and the gauging hole 22 would increase, thus reducing the back pressure in the branch line 36 to which the pressure responsive member 38 responds. Alternatively, if the cross sectional or perimetral dimension of the stock increases, the clearance space between the stock and the gauging hole 22 reduces and the back pressure in the branch line 36 increases and is effective upon the pressure responsive member 38 and the indicator 40.

The action which occurs as above described is comparable to that illustrated in graph 7 and in FIGS. 8 and 9 illustrating conventional flapper nozzle pneumatic detectors. FIG. 9 illustrates an enlarged schematic view of a conventional nozzle and flapper and shows that the effective discharge area for the nozzle fluid is a function of X, being the distance or space between the end surface of the rozzle tip 42 and a flat flapper or plate 44. This distance X can be measured by a pressure responsive member 38 connected by a branch line 36 to line 30 between the nozzle tip 42 and restrictor 34, as seen in FIG. 8. As variations occur in the spacing X between the nozzle 42 and the plate 44, the pressure varies as illustrated by line 48 in the graph of FIG. 7. Note that in the conventional flapper nozzle pneumatic detectors the formula $An=F(x)$ applies.

FIG. 10 shows an analogy of the present device to the conventional flapper nozzle pneumatic detectors. In this arrangement, it will be seen that the equivalent nozzle area relates to the diameter of the stock 24 and the diameter of the hole 22 in the gauge plate. If the stock 24 is exactly the size of the gauge hole 22, no air can escape and the pressure effective on the pressure responsive member 38 will equal the supply pressure. If the cross sectional dimension of the stock 24 is so small compared to the size of the gauge hole 22 that the effective nozzle area, i.e. the area of the clearance space between the stock and the gauging hole is greater than the area of the adjustable restriction 34, then nozzle pressure and the back pressure effective upon the pressure responsive member 38 will drop substantially to zero. In the usual case in which the stock diameter or cross sectional size is such that the area of the clearance space between the stock and the gauge hole 22 is less than the area of the adjustable restriction 34 a back pressure will exist in branch line 36 which will be some function of the stock diameter and will be operative to energize the pressure responsive member 38. Since we are dealing with areas, the back pressure acting on the pressure responsive member 38 will relate to the difference in the diameter squared of the gauge hole 22 in the gauge block 20 minus the diameter squared of the stock being measured. This then responds to the formula shown in FIG. 10: $An = D_2^2$ minus $D_1^2$).

One of the advantages of this device over other means for measuring stock is the fact that the nozzle pressure, that is the pressure effective upon pressure responsive member 38, is a function of the difference in the total circumferential or perimetral area of the stock as compared to the size of the gauging hole 22 and is somewhat independent of the actual shape of the stock. Thus if a perfectly round tube stock 24 of predetermined cross sectional dimension is passed through a round gauge hole 22 of slightly larger diameter to provide a selected clearance when the stock 24 is concentric with the gauging hole, the measurement provided by the device will be valid regardless of deviations of the position of the stock within the hole 22. Thus if such a perfectly round piece of stock of the selected cross sectional dimension is actually sliding along the bottom of the detector hole so that a substantial gap occurs between the uppermost portion of the stock and the upper portion of the gauge hole, the response of the pressure responsive member 38 will be the same as if the stock was perfectly concentric with the gauge hole. This characteristic of the device permits the gauge block 20 to be positioned in a somewhat floating condition as illustrated in FIG. 4, so that it can follow changes in position of the stock passing therethrough in cases where the moving stock is not accurately guided or oriented in space as it passes through the gauge block. Thus it will be seen that if a gauge block 20 is connected to a fixed support 50 by springs or other resilient means 52, the block 20 will be free to change its position as illustrated by the arrows in FIG. 4 to correspond to and compensate for changes in the orientation of the moving stock 24 as it passes through the gauge block 20.

In the case of extruded tubing, it is often found that the product is not completely or perfectly round and that this condition may be acceptable in the final product form if the cross sectional dimension of the tubing is within predetermined limits. FIG. 6 illustrates schematically the use of the apparatus to measure the cross sectional dimension of the outer face of the stock 24' when that stock is elliptical. In this instance the measurement occurs in the same manner described above as long as the elliptical shape entails a major cross sectional dimension not exceeding the diameter of the gauge hole 22 and the minor cross sectional dimension of the tube does not entail an excessive spacing from the gauging hole to increase excessively the pressure drop acting upon the pressure responsive member 38. Stated differently, as long as the elliptical shape of the tube stock does not cause a drop in the pressure effective upon the back pressure responsive member 38 to a value to which the member 38 cannot respond, accurate measurement of circumferential dimension of the elliptical workpiece can occur. It will be understood that while this characteristic has been illustrated and described with relation to elliptical deviations from a circular cross sectional shape, it is also effective in any instance in which the cross sectional shape of stock varies from selected shape without variation of the total perimetral dimension of the stock assuming, of course, that the gauge hole 22 is of a shape corresponding to the selected shape of the stock and of a size to provide slight clearance between the same and stock of selected size and shape.

It is also possible in the use of this device to measure stock which deviates in cross sectional shape from a selected shape to such an extent that on some cross sectional axis thereof its dimension exceeds that of the gauging hole. This is illustrated in FIG. 5 in which it is assumed that a tube of elliptical shape is within reasonable limits of being round as determined by its intended usage but its shape precludes passage thereof through a gauging hole or would require the use of an excessively high volume and pressure of air flow in this device to make a measurement. Assuming that the elliptical tube stock has some resilience or deformability, stock of this characteristic can be measured by the present device by the embodiment illustrated in FIG. 5. In this embodiment the gauging block 22 carries brackets 54 or other suitable means for journaling rollers 56 positioned at the feed side of the gauge block 22 and spaced circumferentially substantially uniformly. The rollers 56 are positioned in selected equispaced relation to the axis of the gauging hole 22 to accommodate a tube of selected size and shape. As the tube stock 24' is fed through the gauge block 22 it passes between the rollers 56 and may be deformed circumferentially thereby, in addition to being guided in centered relation to the gauging hole. Thus the rollers 56 may serve one or both of the functions of (a) guiding the stock for movement in centered relation through the gauge hole and (b) reshaping the stock either temporarily as it passes through the gauge block or permanently for the purpose of making a measurement of its circumferential or perimetral dimension by this apparatus.

It is not necessary that the gauging block be a solid member through the gauging hole of which the stock must be inserted endwise. Thus the alternate construction shown in FIG. 12 may be employed making it possible to apply the gauging block to the stock at any selected point along the length thereof rather than requiring running of the entire length of the stock through the gauging block. In the FIG. 12 construction, the block is illustrated as formed of two sections 60 and 62 having a substantially central parting plane and interconnected adjacent that plane by a hinge 64. The parting planes of the blocks are interrupted by gooves 66 which register when the blocks are closed to define and constitute a gauging hole comparable to the gauging hole 22 previously described. The grooves 66 are interrupted by central deepened portions to define passages which cooperate to define a perimetral deepened passage with one of which the inlet port 70 communicates, the same being connected to the line 30. One of the block sections, here shown as section 60, may carry a gasket 72 engageable with the other section when the parts are closed, it being understood that suitable stop means (not shown) may be provided so that when the parts 60, 62 are closed they will bear a predetermined relation to each other and the surfaces 66 will define a gauging passage of the precise shape and size desired. Any suitable latch means 74 may be carried by one of the block sections and may engage with a retainer 76 carried by the other block section so that when the latch engages the retainer a gauge block having a gauge hole of precise desired size and dimension is provided. Latch 74 will be of any well known type which is readily releasable so as to permit swinging of the block sections to open position illustrated in FIG. 12 for the purpose of application thereof to stock and removal thereof from the stock. The detector or gauging block of the FIG. 12 is employed in the same manner and operates upon the same principle previously described.

Another embodiment of the invention is illustrated in FIG. 11, wherein gauging block 80 has a gauging hole 82 extending therethrough and through which stock 84 is passed for measuring purposes. In this construction, the gauging hole 82 is preferably of uniform dimension from end to end and the block 80 is provided with two or more sets or pairs of opposed gas inlets, such as inlets 86 and 88. The inlets 86 of one set or pair are connected to a pressure line 90 having a variable restrictor 92 and connected with a constant pressure source of selected value. The inlets 88 are connected to pressure line 94 having a variable restrictor 96 and connected to the same pressure source as line 90 or one of equal pressure. A pressure responsive member 98 is connected in line 90 between restrictor 92 and the gauge block inlets 86, and a pressure responsive member 100 is connected to line 94 between the restrictor 96 and the inlets 88.

In the use of the apparatus of FIG. 11, the two lines 90 and 94 will be supplied with gas under the same constant pressure and the restrictors 92 and 96 will be adjusted to equal settings. The stock 84 is then passed through the gauging block and, in the instance illustrated in FIG. 11 wherein the stock is of elliptical cross section, it will be apparent that less resistance to a drop in pressure will occur in line 90 than will occur in line 94. The difference in the pressure drops can be measured at the pressure responsive members 98 and 100 and can be calibrated in terms of deviation of the cross sectional dimension of the workpiece 84 on different diameters thereof from the selected standard. In other words, two continuous measurements are obtained at members 98 and 100 which constitute a measurement of the deviation of the stock from desired cross sectional shape. It will be apparent that this device will function regardless of the centering or position of the stock in the gauging hole. Thus the device can give any selected number of continuous measurements of moving stock depending upon the number of sets of inlets and of associated pressure responsive members, with the resulting measurements being independent of the actual position of the stock within the gauging hole.

While various nozzle area to nozzle back pressure curves as seen in FIG. 7 are non linear, it is possible to utilize a limited section of the curve through the employment of pneumatic pilot valves or high gain transducers, so that the effective relationship over the distance to be measured is reasonably linear. This makes it possible to select a portion of the nozzle curve that is most suitable. Attaining such standardization can be accomplished with a device of this character by inserting in the gauging hole 22 a plug of the nominal required diameter and then adjusting the variable restrictor 34 until the indicator 40 or transducer is positioned at center scale. This scale will normally be set for zero at mid point, with a plus or minus variation on either side in appropriate graduations. Use of the apparatus when so standardized or set will entail the measurement of the stock in terms of variation from a precise standard point, as distinguished from measurement from absolute zero. This method of calibration is quick and extremely simple and can be performed on a routine basis. The gain or sensitivity of the apparatus will be a function of the pressure and flow capacities of the pressure supply, the selected ratio of size of detector hole to the cross sectional size of the moving stock, and the required area of the adjustable restriction, as well as the gain of the pressure-to-pressure or pressure-to-current transducer utilized to amplify the nozzle back pressure. Thus a fairly wide wide latitude will exist in the design parameters for different systems, making it possible to establish desirable gain characteristics for the apparatus.

While the preferred embodiments of the invention have been illustrated and described, it will be understood that changes in the construction and in the method may be made within the scope of the invention.

I claim:

1. Apparatus for continuously gauging stock of selected cross sectional size and shape while the same advances, comprising a gauge block having a stock gauging hole through which stock may be advanced, said hole being of enlarged dimension intermediate opposite faces of said block to define an annular groove, an air supply line communicating with a source of air at selected pressure and with said groove, a restriction in said line having a cross sectional area greater than the clearance area between said stock gauging hole and stock therein, and pressure responsive means connected to said line between said restrictor and said gauge block, and resilient means floatingly supporting and positioning said block relative to stock moving therethrough.

2. Apparatus as defined in claim 1, said resilient means mounting said block for movement laterally of the direction of movement of said stock therethrough.

3. Apparatus for continuously gauging stock of selected cross sectional size and shape while the same advances, comprising a gauge block having a stock gauging hole in which stock fits with small clearance, two pressure lines communicating with a common pressure source and each subject to a restriction of the same value, said lines discharging into said hole at circumferentially spaced points, and independent pressure resonpsive means connected in each line between said restrictor and said discharge.

4. Apparatus as defined in claim 3, wherein each line discharges into said hole at two opposed points, the discharge points of said lines alternating circumferentially.

5. The method of continuously gauging the peripheral dimension of stock of selected cross sectional size and shape consisting of the steps of continuously advancing stock through a gauging aperture of a gauging block, supplying gas from a constant pressure source and through a selected restriction of cross sectional area greater than the cross sectional clearance of the stock in said gauging aperture for discharge into said aperture intermediate the length thereof, and measuring variations in pressure occurring in said line between said restriction and said block, said aperture being of uniform cross sectional size and said gas being discharged into circumferentially spaced parts of said aperture from separate lines subjected to the same pressure and the same value of restriction, and the pressure variations in both of said lines being measured.

6. The method of continuously gauging the peripheral dimension of stock of selected cross sectional size and shape consisting of the steps of continuously advancing stock through a gauging aperture of a gauging block, supplying gas from a constant pressure source and through a selected restriction of cross sectional area greater than the cross sectional clearance of the stock in said gauging aperture for discharge into said aperture intermediate the length thereof, and measuring variations in pressure occurring in said line between said restriction and said block, said stock being positioned in selected relation to said aperture and being reshaped to desired cross sectional dimension along selected radii thereof at a point adjacent to and in advance of said block.

References Cited

UNITED STATES PATENTS

| 2,560,883 | 7/1951 | Mennesson | 73—37.7 |
| 2,728,223 | 12/1955 | Herrman. | |
| 2,731,825 | 1/1956 | Le Van | 73—37.5 |
| 2,779,188 | 1/1957 | Meyer | 73—37.8 |

FOREIGN PATENTS 712,995  8/1954  Great Britain.

LOUIS R. PRINCE, Pirmary Examiner

WILLIAM A. HENRY II, Assistant Examiner